BINARY MULTIPLIER EMPLOYING A DELAY MEDIUM

Filed May 14, 1954

INVENTOR
HERMAN EPSTEIN
BY
Edward J. DaRin
AGENT

Feb. 7, 1961 H. EPSTEIN 2,970,766

BINARY MULTIPLIER EMPLOYING A DELAY MEDIUM

Filed May 14, 1954 4 Sheets-Sheet 2

INVENTOR
HERMAN EPSTEIN
BY
Edward J. Dakin

AGENT

BINARY MULTIPLIER EMPLOYING A DELAY MEDIUM

Filed May 14, 1954

INVENTOR
HERMAN EPSTEIN
BY Edward J. Dakin
AGENT

Feb. 7, 1961 H. EPSTEIN 2,970,766

BINARY MULTIPLIER EMPLOYING A DELAY MEDIUM

Filed May 14, 1954 4 Sheets-Sheet 4

INVENTOR
HERMAN EPSTEIN
BY Edward J. Dakin
AGENT 2,970,766

BINARY MULTIPLIER EMPLOYING A DELAY MEDIUM

Herman Epstein, West Chester, Pa., assignor to Burroughs Corporation, Detroit, Mich., a corporation of Michigan Filed May 14, 1954, Ser. No. 429,791

29 Claims. (Cl. 235—165)

This invention relates to electronic computers and more particularly to an electronic computing system for deriving the product of at least two quantities wherein the product is obtained without employing column shift or over and over addition.

One of the principal considerations in the design of large scale computing devices is the strife for higher speeds within each of the associated units comprising the computer. One of the associated units is usually an arithmetic unit. One of the more difficult problems relating to the arithmetic units is in the design of a high speed computing component for deriving the product of two quantities. The computation of a product of two quantities requires the partial products to be accumulated in the correct order. In the past, this has been accomplished in both mechanical and electrical computers by employing some means for shifting the columns of partial products in order to correctly accumulate them. The shifting operation by decreasing the total number of cycles of operation, tends to increase the speed of the computer, but also increases the number of associated elements, particularly in an electronic computer. Another, but comparatively slow method of deriving a product without employing column shift is by over and over addition. Accordingly, a high speed computing device for deriving the product of two quantities is desired which does not require column shift or over and over addition and which requires a minimum number of operating elements.

An element utilized in the invention as herein described is a delay element of magnetostrictive sonic character which may be constructed substantially in accordance with the teachings of the copending application of Herman Epstein et al. entitled, "Magnetostrictive Delay Line," Serial No. 295,577, filed June 25, 1952, and assigned to the same assignee as this application. The instant invention employs a magnetostrictive sonic delay element having a plurality of novel transducers positioned along the line in addition to the input and output transducers positioned adjacent to the extremities of the line. One form of transducer employed is arranged to produce an output voltage only when there is a coincidental arrival between a voltage pulse introduced into the transducer and a sonic pulse propagating in the delay element which is momentarily passing through the transducer. It is well known that the binary principles of multiplication are well adapted to electronic computation. The instant application of the binary notation is the combining of the multiplier and multiplicand digits represented in the form of voltage and sonic pulses respectively for producing an output voltage pulse only when there is coincidence between same.

It is, therefore, an important general object of the invention to provide an improved electronic computing system.

It is another important object of the invention to provide an improved electronic computing system for deriving the product of two quantities which does not employ either the methods of column shift or over and over addition.

It is still another important object of the invention to provide an improved electronic device employing a magnetostrictive sonic delay element in conjunction with novel coincidence transducer means resulting in higher multiplication speeds.

It is a further important object of the invention to provide a novel coincidence transducer for producing an output upon coincidence of a voltage pulse and a sonic pulse.

It is still a further important object of the invention to provide a new and improved means for deriving the binary product of a successive series of signals applied to a delay element.

It is still another important object of the invention to provide a new and improved means for deriving the product of two quantities wherein the quantities are delivered to a recirculating delay element to enable higher multiplication speeds with a minimum of associated equipment and circuitry.

Generally, the invention utilizes separate digit pulses representative of each of the quantities to be multiplied and introduced into separate static registers. The separate digit pulses are derived or read out of the static registers under control of a delay element or line functioning as a pulse distributor. The delay element controls the distribution of the pulses in such a manner that the individual pulses appear as a pulse train as they are sequentially read out of the static registers and are delivered to a recirculating sonic delay element or line functioning as a pulse coincidence multiplier. The pulse train or signal pattern representative of one of the quantities, e.g., the multiplicand, may be delivered to an input transducer coupled to one end section of the recirculating sonic delay line wherein it may be converted into a sonic pulse train or signal pattern which propagates along the delay line and then is recirculated. The individual digit pulses representative of the second quantity to be multiplied, e.g., the multiplier, are sequentially delivered to the inputs of a plurality of novel coincidence transducers positioned at fixed distances apart along the sonic delay line.

The multiplier pulses or signal pattern are arranged to be successively delivered to all of the coincidence transducers at times which synchronize their arrival with the appearance of the propagated sonic pulse train at each coincidence station. That is to say, the multiplier pulses are timed to be separately and successively delivered to all of the coincidence transducers while the train of pulses representative of the multiplicand is in the sonic delay line and the sonic pulses are passing by the coincidence transducers. If coincidence occurs between the arrival of a multiplier electrical pulse and a multiplicand sonic pulse at each transducer an output pulse is generated which is representative of the binary "one." An absence of such a pulse caused by a non-coincidence of electrical and sonic pulses is representative of a binary "zero." Thus the output of the coincidence transducers as each digit of the multiplier is simultaneously delivered thereto is representative of a partial binary product.

As each sonic pulse reaches the opposite end section of the delay line it is retransformed by an output transducer into an electrical pulse and recirculated back into the input transducer at the opposite end of the delay line element. The recirculation timing is so arranged that the leading sonic pulse is brought around to the coincidence transducer previously occupied by the trailing sonic pulse at the same time the next succeeding digit pulse of the multiplier is being delivered to the transducer. Recirculation of the sonic pulse continues in this manner until after all of the digits of the multiplier are delivered to the coincidence transducers. The pulses generated in the coincidence transducers are representative of the partial binary products and are brought together under controlled delivery to the accumulators of an appropriate product register.

Other objects and features of advantage of the present invention will be found throughout the following more detailed description of the invention particularly when considered in connection with the accompanying drawings in which like reference numerals designate corresponding elements in the several figures.

Figure 1:
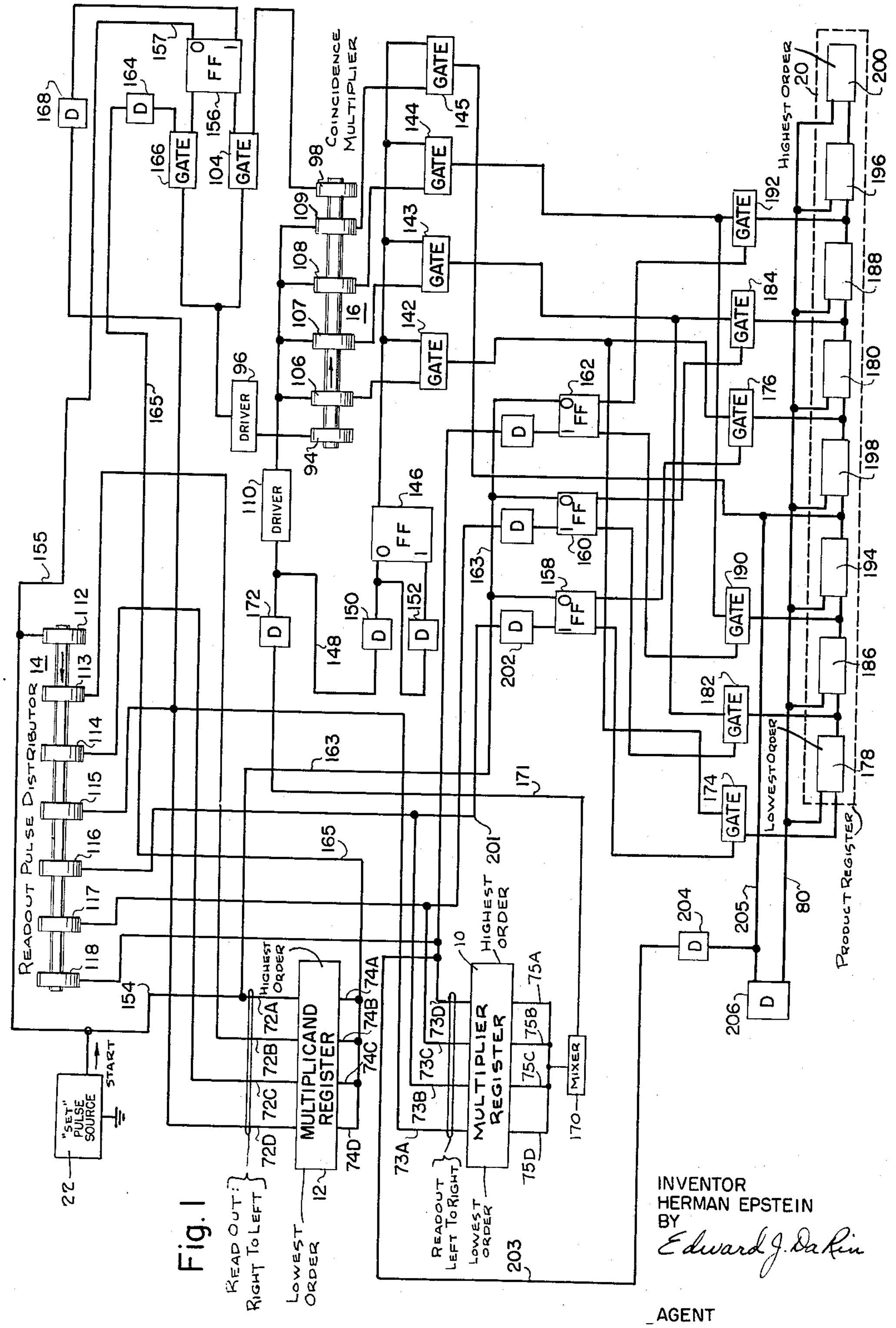
Fig. 1 is a schematic block circuit diagram of one embodiment of a computer constructed in accordance with the invention.
Figures 2, 2A, 3, 3A, 3B, 4, 4A:
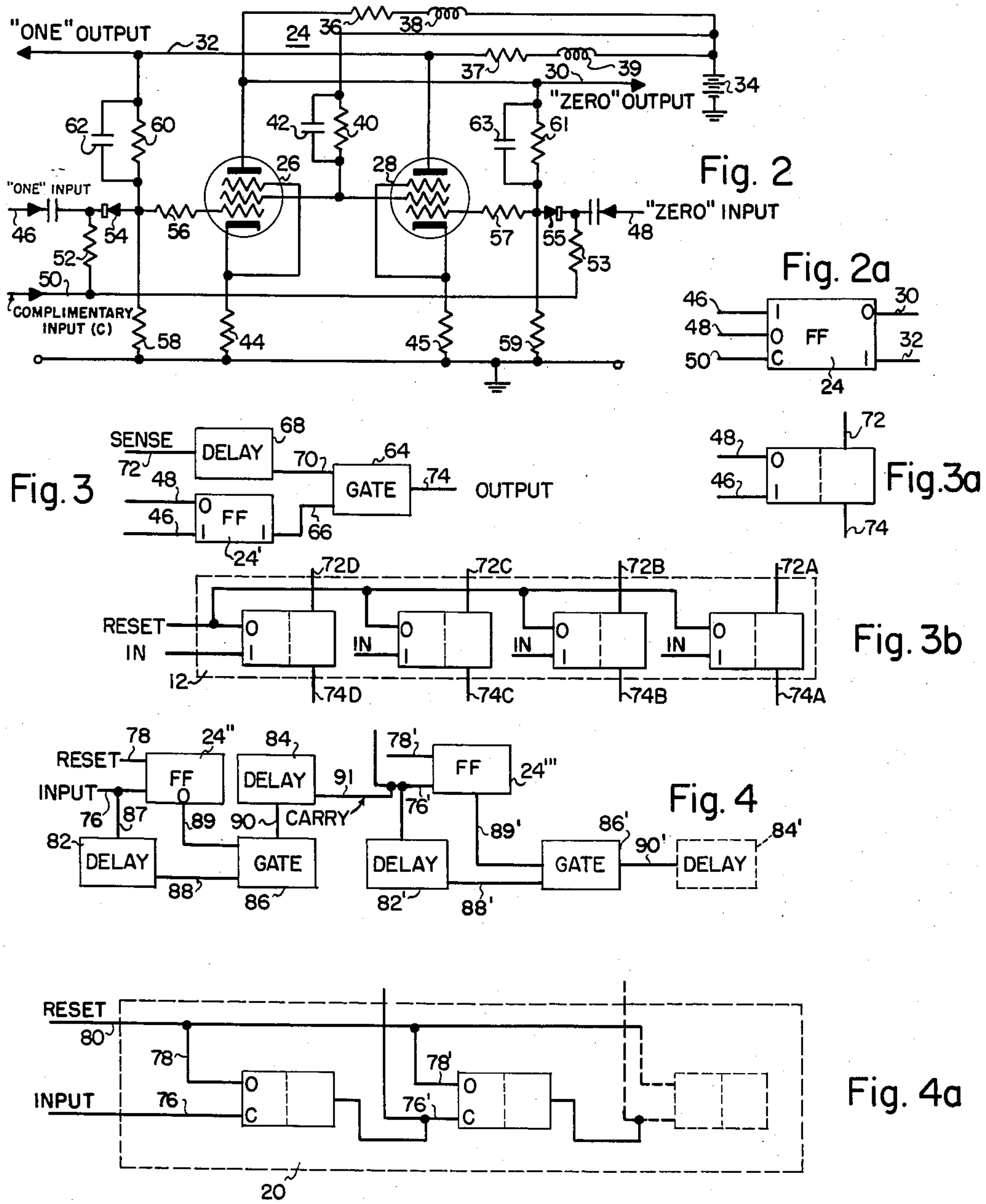
Fig. 2 is a circuit diagram of a bistable circuit typical of those employed by the invention.
Figure 5:
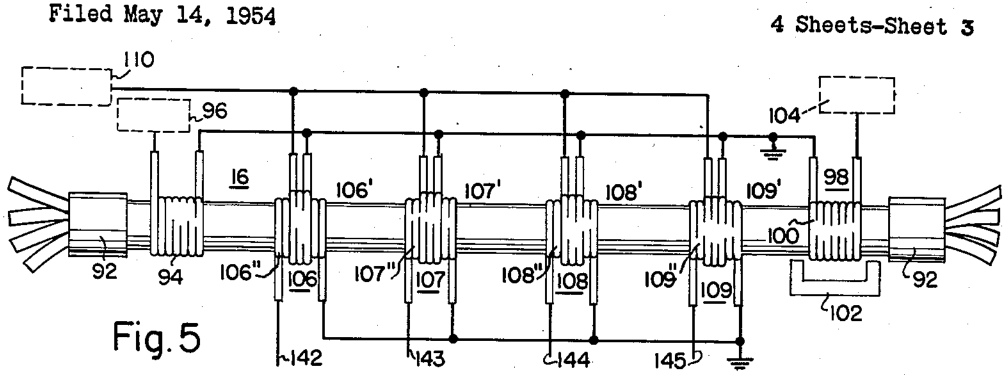
Figure 6:
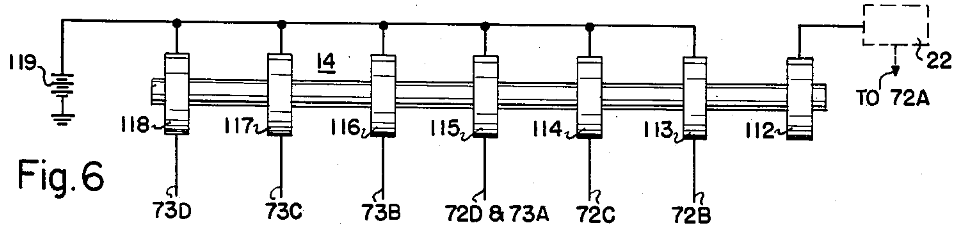
Figure 7:
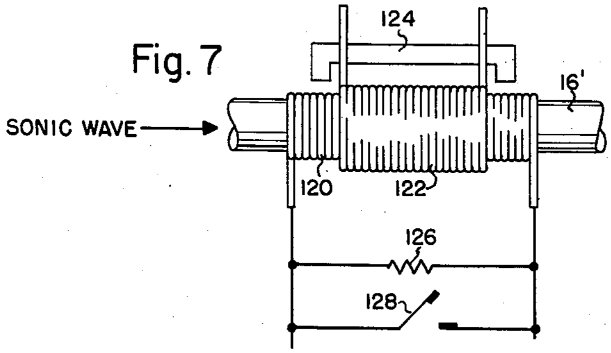
Figure 8:
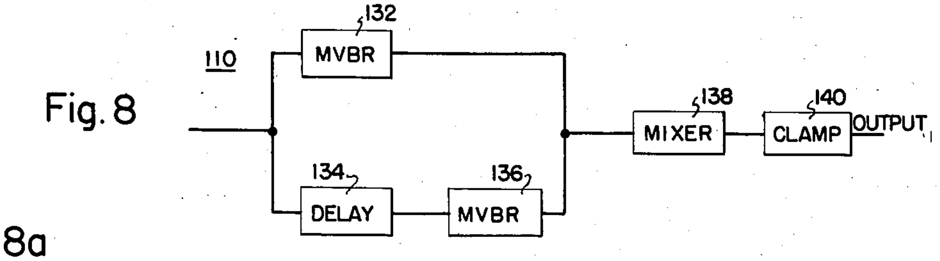
Figure 8A:
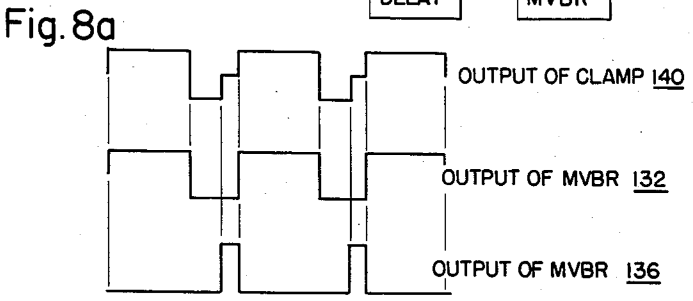
Figure 9:
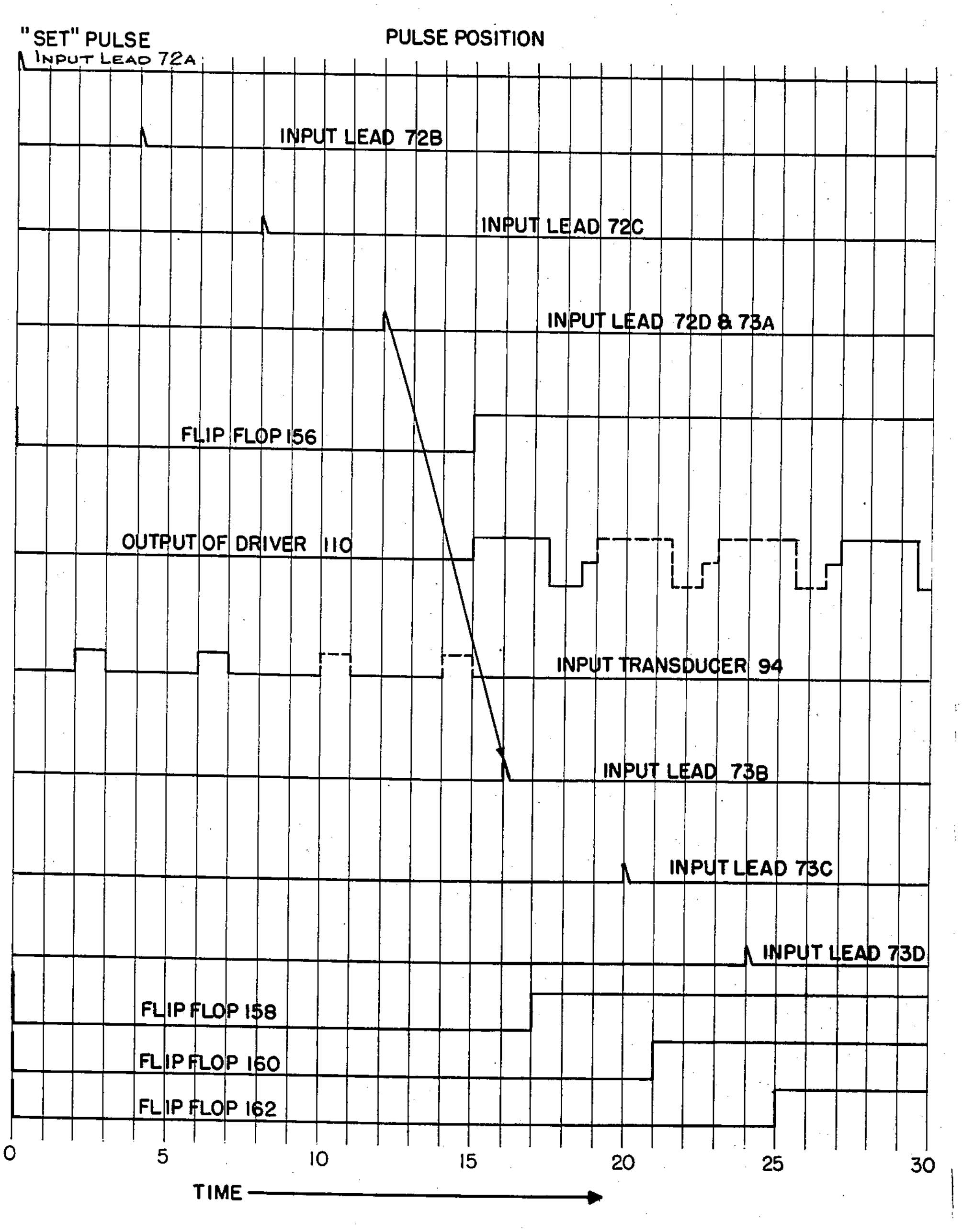

Fig. 2*a* is a diagrammatic representation of the circuit of Fig. 2;

Fig. 3 is a block diagram of the elements of a single element of the static registers, utilizing the bistable device of Fig. 2, employed by the invention;

Fig. 3*a* is a diagrammatic representation of the accumulator of Fig. 3;

Fig. 3*b* is a diagrammatic representation of one of the complete static registers employed by the invention;

Fig. 4 is a diagramamtic representation of the elements associated with a pair of the accumulator units of the product register;

Fig. 4*a* is a diagrammatic illustration illustrating the interconnection of the accumulator units of Fig. 4;

Fig. 5 is a plan view of a delay element utilizing an embodiment of a transducer constructed in accordance with the invention;

Fig. 6 is a diagrammatic representation of a delay element arranged as a pulse distributor in accordance with the invention;

Fig. 7 is a partial plan view of another embodiment of a transducer constructed in accordance with the invention;

Fig. 8 is a block diagram of a driver circuit of Fig. 1;

Fig. 8*a* is a graphic illustration of some of the waveforms employed in the circuit of Fig. 8; and Fig. 9 is a graphic illustration of some of the waveforms employed in the computer constructed in accordance with the invention.

The circuit operation of the computing device involves the action of bistable elements or flip-flop circuits and coacting gating elements which may effect some other operation. The outputs of the bistable elements may be of two different direct current levels and may be so arranged that each output will coact with a separate gating element. The two levels or states may be dencted for convenience as "zero" and "one." A gating element is alternatively known in the art as an "and" circuit or a coincidence detector. This class of circuits generally have an output and a multiplicity of inputs so designed that the output is energized when and only when a certain definite set of input conditions are met. By coupling one of the outputs of a bistable element to one of the inputs of a gating element, whenever that particular output is energized, the gating element may be said to be "conditioned." Therefore, whenever the remaining conditions are met an output will result from the gating element. When the output of the bistable element is de-energized the gating element is referred to as being "de-conditioned" and the output will not respond to the stimuli of the remaining inputs. In accordance with the above definitions, the terms will be used throughout the specification to facilitate the description of the invention.

GENERAL DESCRIPTION

A general outline of the invention will now be explained describing the major elements with reference to the schematic block diagram of Fig. 1. For purposes of explanation the computer is illustrated at it may be constructed for the multiplication of two four bit binary numbers, but it should be understood that its extension to larger binary members, binary coded decimal numbers and the like, is readily apparent to one skilled in the art. The speed of the actual multiplication is determined by the frequency of recirculation and the number of binary digits the system is adapted to handle.

The computer is prepared for the multiplication operation by inserting the quantities to be multiplied, the multiplier and the multiplicand, into separate static registers. The registers are identified by reference characters 10 and 12, the former storing the multiplier and the latter storing the multiplicand. The registers cooperate with a pair of delay lines in order to perform the multiplication of the desired quantities. The delay line generally indicated by the reference character 14, serves as a read out unit or read out pulse distributor to shift the digit pulses out of their respective registers into the second delay line. The latter delay line generally indicated at 16, whose detail operation will be explained more fully hereinafter, functions as a pulse coincidence multiplier and is arranged as a recirculating delay line adapted to receive the digit pulses representative of both quantities to be multiplied in a predetermined time sequence. In novel association with the delay line 16 are a plurality of coincidence transducers which are spaced along the delay line. If there is a coincidence in the reception of two pulses, one voltage and one sonic, by any one of these transducers an output pulse is generated. Such output pulses are delivered through separate circuits to a product register which is embraced by the dotted outline identified by the reference character 20 at the bottom portion of Fig. 1.

The pulses representative of the multiplicand are shifted from the static register 12 into the recirculating delay line 16 in reverse order, descending binary value, and the multiplier pulses are shifted out of the register 10 to the delay line 14 in the usual order, ascending value. This is indicated by legends in Fig. 1. The actual multiplication cycle is started upon the initiation of a "set" pulse from an external pulse source 22 which is arranged to deliver a single pulse to a transducer at one end of the delay line 14. This "set" pulse performs various functions during the multiplication cycles, as will be more fully described hereinafter.

The delay lines 14 and 16 may be sonic delay lines and constructed as hereinafter described. However, for accomplishing the objects of this invention, it is not essential that these delay lines be sonic propagating lines.

The starting or "set" pulse shifts the highest order binary digit out of the multiplicand register 12 and delivers it to a transducer at one end of the recirculating delay line 16. The "set" pulse also initiates a sonic wave at one end of the delay line 14 and electrical pulses are read out at predetermined intervals along the line. The pulses, in turn, are used to shift out the remaining pulses representative of the multiplicand out of the register 12. The directions of propagation of the sonic pulses in lines 14 and 16 are indicated by arrows. The electrical pulse derived to shift out the last multiplicand pulse is also delivered to the multiplier static register 10 to read out the pulse representative of its lowest order binary value. The "set" pulse continues traveling down the delay line 14 and thereby initiates the electrical pulses necessary to read out the remaining multiplier pulses from the register 10. The multiplicand pulses during this period, having been delivered in turn to one end section of the recirculating sonic delay line 16, exist therein as, a sonic pulse train.

Successive coincidence transducers or detectors identified at 106, 107, 108 and 109 are spaced apart on delay line 16 a linear distance equivalent to the time displacement of successive propagating sonic pulses. The coincidence transducers each serve to provide an output pulse when a sonic and electrical pulse coincide at its location along the delay element. Upon the leading sonic pulse arriving at the last coincidence transducer 109, each of the remaining sonic pulses is located along the delay line 16 at one of the remaining transducing stations. It is at this point in time that the first of the multiplier pulses in electrical form is delivered to all of the coincidence transducers. If there is coincidental arrival between a sonic (multiplicand) and an electrical (multiplier) pulse, an electrical pulse will be derived from the associated coincidence transducer. The pulses representative of the partial products are in turn delivered to the product register 20.

Prior to delivery of the next multiplier (electrical) pulse, the leading sonic pulse will have been recirculated to the input transducer of the delay line 16 where it is again transduced into a sonic pulse. The timing of the recirculation is such that when the recirculated leading pulse arrives at the first coincidence station 106, the remaining sonic pulses of the train from which the leading pulse was derived have arrived at succeeding stations along the delay line. At this instant the next multiplier pulses are then delivered to one or more of the coincidence stations. This operation continues until the digit pulses representative of the entire multiplier have been delivered to the coincidence transducers along the delay line. The product register 20 receives the partial products and indicates the final product.

*Flip-flop circuit*

Now referring to Fig. 2, a typical bistable element or flip-flop circuit 24 which may be employed throughout the electronic computer will be described. The flip-flop circuit 24 is shown as comprising a pair of pentode tubes, the left hand tube 26 of which is arranged to provide the "zero" output and the right hand tube 28 of which provides the "one" output. The input circuits of the left and right hand tubes are respectively denoted as the "one" and "zero" inputs, being the reverse of the output circuits. Hereinafter the left and right hand sections of the flip-flop circuits will be identified by at least their input or output designations. A further input is provided which is common to both sections of the flip-flop circuit and will be identified as the "complementary" input. The complementary input is arranged in such a manner that upon the reception of input stimuli therein, the flip-flop circuit will be switched to the opposite state.

The flip-flop circuit 24 is arranged to provide the "zero" output on the lead identified by the reference character 30 and the "one" output on the lead 32. The lead 30 is directly coupled to the plate electrode of the tube 26 and the lead 32 directly to the plate electrode of tube 28. Each of the plate electrodes are further connected to the positive terminal of the power supply, indicated by the battery 34, through similar individual series resistance-inductance networks. The resistors are identified by the reference characters 36 and 37 and the inductances by the reference characters 38 and 39. The screen grids of the two tubes 26 and 28 are commonly connected to the positive terminal of the battery 34 through the parallel combination of resistor 40 and capacitor 42. The suppressor grids are each connected to their respective cathode electrodes. The cathodes are connected to ground through similar resistors 44 and 45. The input circuits are coupled to the control grids of each of the tubes. The input pulses are applied to the leads 46 and 48 corresponding to the "one" and "zero" inputs respectively. The "complementary" input lead 50 is coupled to both the input leads 46 and 48 through similar resistors 52 and 53. The input pulses are applied to the control grids through the series diode-resistor networks 54 and 56, 55 and 57, of the respective tubes 26 and 28. The control grid of tube 26 is connected to ground through the resistor 58 and the tube 28 has its control grid connected to ground through the resistor 59. Each of the control grids is further coupled to the plate electrode of the opposite tube. The control grid of tube 26 is illustrated as being connected to the plate electrode of the tube 28 by means of the lead 32 through the parallel combination of the resistor 60 and the capacitor 62 which is tied to the common junction of diode 54 and resistor 56. Similarly, the control grid of tube 28 is connected to the plate electrode of the tube 26 by means of the lead 30 through the parallel combination of the resistor 61 and capacitor 63 which is tied to the common point between diode 55 and resistor 57.

Upon the application of a triggering pulse of the proper polarity and amplitude to one of the input circuits the flip-flop will be set in either the "one" or "zero" state. The circuit remains in one or the other of these two states with no change in electrode potentials or plate current until some action occurs, like a further triggering potential or pulse applied to the input leads, which will cause a reversal of the conditions. When a trigger pulse is applied to the lead 46 or 48 it will cause the corresponding tube 26 or 28 to conduct unless it is already conducting; in which case there is no change in the circuit.

The lead 50 which is designated as the complementary input affords a simple method of reversing the condition of the flip-flop regardless of its previous condition and may be used to reset the flip-flops back to their initial state.

Upon the application of a triggering pulse to the lead 50 it is coupled to both grid input circuits. The trigger pulse does not initially affect the tube that is conducting, but causes a change in the non-conducting tube in substantially the same manner as when a trigger pulse is applied directly to the "zero" or "one" inputs.

The tube outputs representative of the "zero" and "one" states are arranged to provide different direct current voltage levels and may be connected to control either a single gating circuit through the use of one of the outputs or a pair of gating circuits by both outputs. The gating circuits that may be employed in conjunction with the flip-flops are well known in the art and may employ either crystal diodes or multi-grid electronic devices.

Fig. 2*a* is a block diagram representation of the flip-flop circuit 24 indicating the various external connections to the circuit. The input and output leads are identified by both their respective reference characters and their storage state, "zero" and "one," as similarly designated in Fig. 2. It should be noted that when it is not desirable to utilize the complementary input C, the resistors 52 and 53 as illustrated in Fig. 2 may be omitted. Connections to the remaining terminals indicates the inclusion of the elements substantially as illustrated in Fig. 2.

*Registers*

Now referring to Figs. 3 and 4 an application of the flip-flop circuit 24 as it may be employed as a static register for the quantities to be multiplied or as a final product accumulator in the computer will be explained. However, it should be understood that this embodiment is merely illustrative of the invention and that any of the known static registers such as a magnetic shift register, for example, may be employed.

Fig. 3 illustrates by way of block diagram an arrangement which may be employed in the multiplier register 10 or multiplicand register 12 utilizing the flip-flop circuit 24 in combination with the aforementioned types of gating circuits. The registers 10 and 12 are arranged to allow the quantities to be multiplied to be entered into each accumulator in parallel. As hereinabove described each of the registers is arranged to accept a four bit binary number. The diagram illustrated in Fig. 3 represents the associated circuitry to accumulate and read out a single binary bit since the extension of the register to a four bit capacity is readily apparent. The inputs of each flip-flop corresponding to the "one" input lead 46 as illustrated in Fig. 2, may be individually connected to separate switches, for example, to allow manual insertion of the binary bits into the respective registers. The flip-flop 24' is arranged initially in the "zero" state and, therefore, it is merely necessary to reverse the state of the flip-flops in which a binary "one" is to be registered. The output of the flip-flop 24' is coupled to the gating circuit 64 from the "one" output. The registers are reset to their initial "zero" state by the application of a triggering pulse to the "zero" input lead. All of the reset input leads for each register representative of a binary bit may be connected together to allow simultaneous clearing of either the multiplier or multiplicand register or both.

Upon the application of a triggering potential to the input lead 46 of the flip-flop 24' the output will be reversed to the D.C. level representative of the "one" state. Since the gating circuit 64 has one of its input circuits coupled directly to the "one" output of the flip-flop 24 by the lead 66, the gate 64 will be "conditioned." With each flip-flop and gating circuit there may be provided a delay circuit, identified by the reference character 68, which affords a delay such as approximately one-fourth of a micro-second. The delay circuit 68 is directly coupled to the second input circuit of the gating circuit 64 by the lead 70. The second pulse delivered to the gate 64 by means of the delay 68 may be termed a "sense" pulse. The "sense" pulse is derived either directly from the pulse source 22 or from the various transducers located on the pulse distributor delay line 14 as a result of the initiation therein of a sonic pulse as will be described more fully hereinafter. Upon the simultaneous arrival of a pulse at both the leads 66 and 70 of the gate 64 an output pulse will be produced at the output lead 74 of the same. It is, therefore, apparent that an output pulse will appear on the gate lead corresponding to the lead 74 only when the gate is conditioned by the storage of a "one" in the associated flip-flop.

In Fig. 3*a*, the elements described in Fig. 3 that comprise a storage element for a single binary bit are illustrated in the combined form of a block diagram. The diagram illustrates the external connections of a storage element similar to that described in Fig. 2*a*. The block representative of a single storage unit is divided by a dotted line into a left hand and right hand portion. The left hand portion is representative of the flip-flop 24' while the right hand portion is representative of the combination of the gate 64 and the delay element 68.

Fig. 3*b* is a schematic block diagram of the multiplicand register 12. The register 12 is illustrated as comprising a series of the elements illustrated in Fig. 3*a* in interconnected relation. The reset leads of the units which are connected to the "zero" inputs of the same, are illustrated connected in common to allow the simultaneous clearing of each unit of the register. In the register 12 the input leads 72A, 72B, 72C and 72D correspond to the input lead 72 of Fig. 3*a*, and the output leads 74A, 74B, 74C and 74D correspond to the output lead 74 of Fig. 3*a*. The multiplier register 10 is constructed in a similar manner with the input and output leads corresponding to 72 and 74 of Fig. 3*a* identified by the suffixed characters 73 and 75 respectively as illustrated in Fig. 1.

Now referring to Fig. 4, the arrangement of flip-flops and gates that comprise two of the accumulator units of the product register 20 will be explained. Each of the flip-flop accumulator units is representative of a different binary order. The flip-flop accumulators are arranged initially in the "zero" state and the "zero" input is utilized along with the "complementary" input lead, identified by the reference character 76. The "zero" input 78 provides the clearing or resetting operation for the product register 20 and each of the "zero" inputs for the individual accumulator units may be connected in common as described and shown in conjunction with the diagram of Fig. 6. This common resetting lead in Fig. 1 is identified by the reference character 80 and will be described in more detail in connection with the detailed description of that figure in connection with the operation of the computer system. The only output level of the flip-flop utilized in the accumulators is derived from the "zero" output. With each flip-flop accumulator there is provided a pair of delay elements 82 and 84 and a gating unit 86. The delay unit 82 has its input directly connected to the input 76 of the flip-flop 24'' by means of the lead 87. The output of the delay element 82 is directly connected to one of the inputs to the gate 86 by the lead 88. The remaining input of the gate 86 is connected by the lead 89 to the "zero" output of flip-flop 24''. The output lead 90 of gate 86 is coupled to the input of delay element 84 by the lead 90. The input pulse delivered to the delay 84 is directly connected to the input 76' of the flip-flop 24''' by the lead 91. The lead 91 may be further identified as the "carry" output lead to couple a carry-over pulse to the succeeding accumulator unit of the product register. A carry-over pulse results when two successive inputs are applied to the same accumulator unit. Similarly, the delay and gate elements 82' and 86' respectively are connected to cooperate with the flip-flop 24''' as in the previous accumulator arrangement.

Now considering the operation of the flip-flop accumulators in more detail, the need to provide the delay elements in combination with the gating elements will be apparent. An input pulse delivered to the lead 76 is coupled to both the "complementary" input of flip-flop 24'' and the input to the delay element 82. The delay element 82 may provide a delay in the order of one quarter micro-second. The provision of a delay assures the operation of the flip-flop 24'' which in turn conditions the gate 86 prior to the arrival of the input stimuli initiated by the same input pulse from the delay 82. This input pulse may be representative of a binary "one" and will reverse the state of flip-flop 24'', registering a "one." The "one" output of the flip-flop 24'' is not used with the gating element 86 and, therefore, will not affect the gate when switched in that state. The same pulse distributed to the delay 82 will arrive at the gate 86 and will condition same; but no output will appear on the lead 90 since the flip-flop 24'' is in the "one" state. Upon the arrival of a second pulse to the input lead 76, it too will be delivered to the flip-flop 24'', the delay element 82 and in turn to the gate 86. The second pulse upon arriving at the flip-flop 24'' will reset it back into the "zero" level and thereby provide a stimulus for the input of gate 86 connected to the "zero" output. Therefore, after the pulse emerges from the delay 82 and arrives at the gate 86, an output pulse will appear on the lead 90. This output or carry-over pulse is representative of the initial pulse that was registered in the flip-flop 24'' and is shifted into the succeeding accumulator, representative of the next highest order binary quantity. The output pulse is coupled to the complementary input of flip-flop 24''' by means of the delay element 84 which is substantially similar to the delay element 82. The delay element 84 is provided in order to assure the proper direct accumulation in the flip-flop 24''' through the same input prior to the entry of the carry-over pulse. The flip-flop 24''' is in turn similarly coupled to the succeeding flip-flop accumulator representative of the next highest order binary quantity as hereinabove described. The flip-flop accumulator representative of the last or highest order binary quantity differs in its input circuit since it is operated solely by a carry-over pulse.

Referring now to Fig. 4*a*, each of the accumulators and their associated elements are illustrated diagrammatically as they may be grouped as the final product register 20 of Fig. 1. As in the previous illustrations of this nature only the external connections are shown. It should be noted that a connection to the input lead 76, and corresponding primed input leads, results in a connection to both the associated flip-flop and the delay element such as the element 82. Similarly, the carry-over connection between accumulator units is connected to the delay element 84 and corresponding elements. Each of the "zero" inputs are illustrated connected in common by the lead 80 and separate connections 78, 78' etc.

*Delay elements*

Referring now to Figs. 5 and 6 the action of the delay lines and their associated transducers will be described. The delay lines 14 and 16 employed with the computer may be magnetostrictive sonic delay lines constructed in accordance with the description of the aforementioned Epstein et al. application for patent. However, it should be understood that the reference to the use of a magnetostrictive sonic delay element is merely to facilitate the description of the invention and any of the known delay lines may be employed. As used herein, the term line or element may be stated as a continuous material medium or signal transmission medium to denote a channeling of signal energy along a defined path.

The magnetostrictive delay lines 14 and 16 may be constructed of nickel tubing arranged with an echo suppression means 92 at each of its opposite ends. The magnetostrictive delay line operates upon a pulse of current being delivered to a coil coupled to or wrapped around one end section of the magnetostrictive material causing a distortion in the physical dimension of the element. This elastic disturbance is propagated along the magnetostrictive delay line toward the opposite end thereof as a sonic wave. The sonic wave will be retransformed into an electrical wave at the opposite end of the magnetostrictive delay line through the interaction of a biasing magnetic flux and a coil coupled to the delay line. The sonic wave will cause a change in flux through the coil and thereby induce a voltage pulse. A delay between the entry and emergence of the electrical pulse will be effected in accordance with the sonic velocity characteristic of the magnetostrictive material.

The delay line illustrated in Fig. 5 represents the recirculating delay element 16 and shows the construction of the transducers and the relative position thereon. The delay line 16 requires an input transducer to initiate a sonic wave as a result of an electrical pulse delivered thereto and an output transducer to reconvert the sonic wave into an electrical pulse for recirculation back into the input transducer. The direction of propagation of the sonic wave between these two transducers is indicated by an arrow. The input transducer, identified by the reference character 94, may consist of a coil wrapped around a small area of one end section of the metallic magnetostrictive tubing 16. The coil has one terminal grounded and the remaining terminal connected to the electrical input circuit, in this instance the driver circuit 96. The output transducer 98 may consist of a coil 100 wrapped around a small area of the opposite end section of the delay line and a permanent magnet 102 supplying a flux source for the transducer. The coil 100 has one terminal grounded and the remaining terminal connected to an input of a gating circuit 104. It, therefore, may be seen that the magnetic condition required to derive an electrical pulse from the delay line is present in the output transducer 98. From this, it may be seen that the control of an output voltage at any transducer may result from controlling the presence of either a sonic pulse or the magnetic field.

Between the input transducer 94 and the output transducer 98 there are provided a plurality of spaced apart coincidence transducers 106, 107, 108 and 109. Each of the coincidence transducers illustrated in Fig. 5 consists of a pair of coils, an input coil wrapped around the delay line and an output coil wrapped around the input coil. The input and output coils are identified respectively by the single and double primes of their reference numbers. Each input coil has one terminal grounded and the remaining terminal connected to a common input source, the driver circuit 110. The output coils each have a grounded terminal and the remaining terminal connected to separate gating circuits as will be described more particularly hereinafter. The input coils are effective to control the magnetic condition of each transducer. Therefore, it is necessary for the propagating sonic pulse to arrive at one of the coincidence transducers during the same interval of time the input coils are energized to produce an output pulse. The transducers thus serve as coincidence detectors or gates requiring two simultaneous inputs to produce an output signal. This coincidental method of obtaining an output pulse is applicable to binary notation, as it may be readily appreciated, since the absence of either pulse would represent a binary zero and no output is representative of no product. The presence of both pulses represents two binary "ones" being multiplied and the output pulse the product of same.

With the general description of the delay line 16 in mind the structural arrangement of the pulse distributor delay line 14 illustrated in Fig. 6 will be described. The delay line 14 is provided with an input transducer 112 at one end and a plurality of output transducers 113, 114, 115, 116, 117 and 118 spaced apart from one another and the input transducer. The direction of propagation of the sonic wave is indicated by an arrow. The output transducers are spaced apart equal electrical distances from one another, that is, as a sonic pulse travels along line 14 output pulses are produced in successive transducers at equal time intervals, thus defining a pulse repetition rate, or pulse spacing which is basic in the operation of the computer. The construction of the input transducer 112 may be similar to the corresponding input transducer 94 on the delay line 16. The input transducer 112 is coupled across the pulse source 22. The pulse source 22 is arranged to provide a single pulse upon the momentary closing of a switch, push button or the like. Each output transducer 113 to 118 may generally correspond in structure to the output transducer 98 of the delay line 16. However, each output transducer 113 to 118 is arranged with a second coil, input coil, to provide and control the biasing magnetic field in lieu of the permanent magnet 102 associated with the transducer 98. Each of the input coils is connected to a direct current source 119 and may be said to magnetically condition or bias the transducers. Therefore, it is apparent that with suitable magnetic bias and upon the passage of a sonic pulse through any one of the output transducers 113 to 118 a pulse will be produced in the output coil. The output coils each may have a terminal grounded and the remaining terminal of each coil is connected to at least a single accumulator unit of the multiplier and multiplicand registers 10 and 12 respectively as indicated in Fig. 6. The pulses derived from the pulse distributor 14 may be termed as "sense" pulses and are delivered to the delay line corresponding to the delay 68 of an accumulator associated therewith in the manner described in conjunction with Fig. 3.

Now referring to Fig. 7 another embodiment of a coincidence transducer which may be employed in conjunction with the delay lines is shown. In contrast with the coincidence transducers described hereinabove which controlled the output pulse by controlling the presence of a magnetic field and of the sonic pulse, the present embodiment controls the output by the impedance loading of the input coil with or without magnetic biasing.

The transducer comprises the input coil 120 wrapped around a small area of the delay element 16'. An output coil 122 is wrapped around the input coil 120, as in the aforementioned embodiments. Also, a magnetic flux source is provided by the permanent magnet 124. Across the input coil 120 there is arranged a high impedance 126 in parallel relationship with a shorting switch 128. The loading of the input coil depends upon the known transformer principle of impedance ratio. It has been found that an output pulse will be produced in the output coil 122 if the input coil 120 is loaded with the high impedance 126, switch 128 being open. This may be readily appreciated, since the impedance as seen from the output coil 122 will appear as the product of the high impedance 126 and the turns ratio of the output coil to the input coil squared. Similarly, if the input coil 120 is loaded with a very low impedance, or preferably a short circuit, no output pulse will be produced. A short circuit may be provided by the switch 128. It is readily apparent that the impedance loading of the input coil 120 may be controlled by electronic means equivalent to the combination of the impedance 126 and switch 128. Thus, the change of loading impedance provides a conditioning factor which, in connection with another factor from among those previously mentioned, determines whether an output impulse will or will not be obtained from the output coil of a transducer, and this factor can be controlled at high speeds by electronic means, as above referred to.

*Driver*

It has been found that erroneous operation may result from spurious pulses generated at any one of the coincidence transducers 106 to 109 on the delay line 16 as a result of residual magnetism induced therein. Therefore, it is desirable to nullify this effect. The driver circuit, generally identified by the reference character 110 of Fig. 8, provides an output waveform of such a character that it will tend to neutralize any residual magnetism at the coincidence transducer. The resulting output voltage waveform is illustrated in Figs. 8*a* and 9. The waveform has been selected with the positive portion of the waveform of sufficient time duration and amplitude to allow the coincidence operation, while the negative portion has been selected to substantially neutralize the effect of the residual magnetism.

The driver circuit 110 is arranged to receive the pulses representative of the multiplier binary bits and reshape them in accordance with the aforementioned waveform for delivery to the input coils of the coincidence transducers 106 to 109. The multiplier pulses are simultaneously delivered to the driver circuit parallel combination of the multivibrator 132 and the series arrangement of the delay element 134 and the multivibrator 136. The outputs of each of the multivibrators are connected in common and coupled to the mixing circuit 138. The mixing circuit 138 is effective to combine the output pulses provided by the multivibrators 132 and 136. The mixing circuit is in turn directly coupled to the clamping circuit 140 which is coupled to the input coils of the coincidence transducers 106 to 109. A clamping circuit, as is well known in the art, holds the amplitude extremes of a waveform to a given reference level of potential. The multivibrator circuits 132 and 136 may be of the well known triggered Eccles-Jordan circuits.

The output of the multivibrator 132, illustrated and identified in Fig. 8*a*, is arranged with positive and negative portions of equal amplitude with respect to the reference level. The time duration of the positive portion has been selected to exist for approximately two and one-half micro-seconds and the negative portion of approximately one and one-half micro-seconds. The output of multivibrator 136 is a series of positive pulses of one-half micro-second duration occurring within the last one-half section of the negative portion of the waveform derived from the multivibrator 132. These two outputs are combined in the mixing circuit 138 and clamped to the proper reference level by the circuit 140 prior to delivery to the coincidence transducers. The resulting waveform delivered by the clamping circuit 140 is shown in Fig. 8*a* as the output of clamp 140.

To further prevent any spurious pulses from entering the product register 20, each of the output pulses from the coincidence transducers is coupled to individual gating circuits. The entry of the partial products is controlled by controlling the conditioning of the gating circuits. The output coils of the coincidence transducers 106 to 109 are each coupled to an input of the gating circuits 142, 143, 144 and 145 respectively as illustrated in Fig. 1. The remaining input of each gating circuit is connected as shown in Fig. 1 to the output of the flip-flop 146, to allow the associated gating circuits to pass pulses therethrough only during the time intervals that partial product pulses would normally appear at the output coils of the coincidence transducers, that is, during the 15½ to 17 microsecond interval, for example. The flip-flop 146 is triggered by the same input pulse derived from the multiplier register 10 that is delivered to the driver circuit 110 which controls the input coils of the coincidence transducers as hereinabove described. The pulse is delivered by the lead 148 to the delay element 150 in series with one of the inputs of the flip-flop 146 and conditions the gating circuits 142 to 145. The delay element 150 may provide a delay of one-half microsecond in this instance. The pulse from the delay element 150 is connected to a further delay element 152 which is in series with the other input of the flip-flop 146 and the pulse thereby delivered is effective to switch the state of the flip-flop 146 and decondition the gates 142 to 145. The delay provided by the element 152 is approximately one and one-half microseconds. This allows sufficient time for the coincidence detection action to occur. It should be noted that if the multiplier digit represents a binary zero, the flip-flop 146 is not triggered to condition the associated gates and as desired no stimuli will be delivered to the product register 20.

*Computer system*

Now referring to Fig. 1, the detailed circuit operation of the computer system will be explained. For purposes of explanation only, the delay provided between successive transducers on the pulse distributor delay line 14 has been arranged to be approximately four microseconds. The recirculating delay element 16 is arranged with approximately four microseconds delay between successive coincidence transducers 106, 107 etc. The delay provided between the input transducer 94 and the coincidence transducer 106 is approximately two microseconds. Similarly, the delay provided between the coincidence transducer 109 and the output transducer 98 is approximately two microseconds. Thus, the time taken in transferring a sonic pulse from the location of transducer 109 to that of transducer 106 is the same as that required for the propagation of the pulse between successive coincidence transducers. The recirculation frequency is assumed to be around 250 kilocycles. As hereinabove described, the actual multiplication cycle begins after the quantities to be multiplied have been stored in their respective registers. The multiplication cycle is initiated by energizing the pulse source 22. The pulse source 22 produces a single pulse which will be termed the "set" pulse. The set pulse in initiating the multiplication cycle does four things: (1) it shifts the first digit of the multiplicand out of the multiplicand register 12 by means of the input leads 154 and 72A; (2) it enters the readout pulse distributor 14 by means of lead 155 and transducer 112; (3) it is delivered to the flip-flop 156 by the leads 155 and 157, which sets the flip-flop 156 to allow the pulses from the multiplicand register to enter the recirculating delay element 16; and (4) it is delivered to the flip-flops 158, 160 and 162 by the leads 154 and 163 in order to control the product register 20. The set pulse is initially delivered to read out or sense the first or highest order digit of the multiplicand to be delivered to the recirculating delay element 16, which in the particular example set forth hereinafter is one and, therefore, there will be a pulse delivered to the delay element 16. The set pulse meanwhile has entered the pulse distributor delay line 14 and has initiated a sonic pulse therein. When the sonic pulse arrives at the first transducer 113 a second sense pulse will be derived therefrom which is delivered by lead 72B to the multiplicand register to read out the second digit from the right end or next highest order digit of the multiplicand binary number. Similarly, upon the sonic pulse reaching the transducers 114 and 115 sense pulses are delivered through the leads 72C and 72D respectively. The sense pulse derived out of the transducer 115 is also delivered by the lead 73A to sense and read out the first digit at the left end of the multiplier number in the register 10, which in this case is the lowest order digit. Therefore, as it may be seen on the timing chart of Fig. 9, twelve microseconds after the multiplication cycle was initiated all pulses representative of the multiplicand have been read out of the register 12.

The pulses read out of the multiplicand register 12 are each successively delivered to the delay element 164 by the lead 165. The delay element 164 may provide a delay of approximately two microseconds. The output of the delay element 164 is connected to one of the inputs of the gating circuit 166. The remaining input of the gate 166 is controlled by an output from the flip-flop 156. Since the set pulse was initially delivered to the flip-flop 156, it conditioned the gate 166 to allow the multiplicand pulses to be delivered to the input transducer 94 of the delay line 16 by way of the driver circuit 96. Therefore, fifteen microseconds after the multiplication cycle was initiated, all of the pulses representative of the multiplicand have been introduced into the recirculating delay line 16.

The delay line 16 is next prepared for recirculating the pulses representative of the multiplicand during the intervals between successive transfers of the multiplier digit pulses to the coincidence transducers 106 to 109. The means for preparing the recirculation loop is a pulse derived from the pulse distributor delay line 14.

Referring back to the transducer 115 positioned on the readout pulse distributor delay line 14, it may be seen that the pulse derived therefrom is further distributed to the delay element 168 which is connected in series with the remaining input of the flip-flop 156. The delay element 168 may delay the pulse for approximately three microseconds before it resets the flip-flop 156. The resetting of the flip-flop 156 de-conditions gate 166, preventing the delivery of any more pulses to the input transducer 94 positioned on the recirculating delay line 16. Furthermore, in resetting flip-flop 156, gating circuit 104 is conditioned. The gate 104 is connected in the recirculation loop of the delay element 16 and in this condition allows the recirculation of the pulses as more particularly described hereinafter.

During the interval between twelve and twenty-four microseconds the binary bits representative of the multiplier are being sensed and read out of the register 10. The read out of the first digit of the multiplier has already been described. The remaining three digit pulses representative of the multiplier are sensed by pulses derived from transducers 116, 117, and 118 as the sonic pulse initiated by the "set" pulse continues its travel in the delay line 14. Binary "zeros" and "ones" sensed in the multiplier register 10 appear on the output leads identified by the reference characters 75A, 75B, 75C and 75D and are sequentially delivered to the mixer circuit 170 from which they are delivered by lead 171 to the delay element 172 which is in series with the inputs to the driver circuit 110 and the delay element 150. The driver circuit 110 reshapes the binary one multiplier pulses as hereinabove described and delivers each such pulse simultaneously to each of the coincidence transducers 106 to 109. The delay element 172 may provide a three microsecond delay.

Meanwhile, the electrical pulses representative of the multiplicand have been converted into sonic pulses along the delay line 16 and each pulse has travelled so as to be positioned opposite a different coincidence transducer. This requires that the time taken by a pulse to travel from one transducer to the next be equal to the interval between successive pulses applied to the input of the line. Upon delivery of a multiplier pulse to a coincidence transducer, an output pulse will result if both a sonic "one" and an electrical "one" appear at any one coincidence station. After arrival of the first multiplier pulse, the sonic pulses continue their travel in the delay line 16 until the leading sonic pulse arrives at the output transducer 98 wherein it is retransformed into an electrical pulse and recirculated through the conditioned gate 104 and the driver circuit 96 back into the input transducer 94. Approximately four microseconds after the leading sonic pulse left the last coincidence transducer 109, it appears as a sonic pulse at the concidence station 106. At this time, the next multiplier pulse from the register 10 is delivered to all of the coincidence transducers 106 to 109. The partial products are once again derived from the coincidence transducers and prepared for delivery to the product register 20. Similarly, the cycle of coincidence, recirculation and coincidence, continues until all the multiplier digit pulses have been delivered to the delay line 16.

In completing the multiplication cycles, the problem remaining is to accumulate the partial products in the correct accumulators of the product register 20. Each of the accumulators is representative of a different binary power, of ascending order reading from left to right, or in the embodiment illustrated in Fig. 1, from zero to seven. Each of the accumulators is prepared to receive a partial product therein by a flip-flop gate combination. As hereinabove described, the "set" pulse is also delivered by lead 163 to the flip-flops 158, 160 and 162 which sets them in the zero state. It is these flip-flops which control the gating circuits which in turn condition the accumulators of the product register 20 to receive the partial products therein. The flip-flop 158 controls the gating circuits 174 and 176 and thereby the accumulators 178 and 180. The flip-flop 160 controls the gating circuits 182 and 184 which in turn control the accumulators 186 and 188. The flip-flop 162 controls the gating circuits 190 and 192 which in turn control the accumulators 194 and 196. The "set" pulse delivered to the flip-flops 158, 160 and 162 causes the accumulators 178, 186 and 194 to be prepared to receive partial products therein. The accumulator identified by the reference numeral 198 is not controlled by an associated flip-flop and gating circuit, but is always conditioned to receive a partial product pulse therein during the multiplicand cycle. Also, the accumulator 200, which is representative of the binary power of seven is not controlled by an associated flip-flop and gating circuit. The accumulator 200 merely registers a carryover pulse from the accumulator 196.

Referring back to the distribution of the sensing pulses from the distributor 14, it may be seen that the pulse delivered to the multiplier register input lead 73B is also distributed to the flip-flop 158 through an appropriate lead 201 and delay element 202. This stimulus resets the flip-flop 158 in such a manner that it de-conditions the gating circuit 174 and conditions gating circuit 176. Thereby the accumulator 178 is de-conditioned and the accumulator 180 conditioned. This preparation of the product register 20 occurs between the time the first and second multiplier pulses are delivered to the recirculating delay line 16, as may be appreciated by reference to the timing chart of Fig. 9. Similarly the flip-flops 160 and 162 are controlled by pulses derived from the leads 73C and 73D respectively. The reset action of the flip-flop 160 will de-condition gating circuit 182 and correspondingly condition gating circuit 184. This de-conditions the accumulator 186 and conditions the accumulator 188. This action occurs during the interval between the delivery of the second and third multiplier pulses to the delay line 16. The flip-flop 162 is reset during the interval between the delivery of the third and fourth multiplier pulses so that the gating circuits 190 and 192, and the corresponding accumulators 194 and 196 are de-conditioned and conditioned respectively.

Upon completion of the entire multiplication cycle, automatic provision for resetting the computer for the next computing operation may be provided for. The resetting operation may be accomplished by coupling a pulse from the lead 73D of the multiplier register 10, for instance, to the input lead 203 of the delay element 204. The output of the delay element 204 is connected to a further delay element 206 in series with the common reset lead 80 provided for each of the accumulators. This operation resets each of the accumulators in the zero state. It may also be desirable to provide for rounding off the final product. This may be accomplished by coupling the pulse from the output lead of the delay element 204 by way of lead 205 to the input terminal of the accumulator 198 which is the radix point for the four bit binary computer.

EXAMPLE

The description of the operation of the computer system in deriving the product of a particular multiplier and multiplicand will now proceed on a time sequence basis with particular reference to the timing diagram of Fig. 9. The example will be carried out to multiply the multiplicand, 12 (in binary form 1100), by the multiplier, 9 (in binary form 1001), to derive the product 108. The diagram of Fig. 9 illustrates the computation of the quantities and illustrates the absence of a pulse by dotted lines. The timing diagram of Fig. 9 in addition to illustrating the time sequence of distributing the multiplier and multiplicand digit pulses illustrates the sequencing of the flip-flops 156, 158, 160 and 162. As hereinabove described, the flip-flop 156 controls the delivery and recirculation of the multiplicand digit pulses on the delay line 16. The flip-flops 158, 160 and 162 control the accumulators of the product register 20.

In carrying out the multiplication of the example, it may be well to compare the decimal multiplication operation with the binary operation as shown in the below chart:

```
12=multiplicand=    1100
 9=multiplier   =   1001
                    ----
                    1100   (1)
                   0000    (2)
                  0000     (3) partial Products
                 1100      (4)
                 -------
108=product      =1101100
```

As shown in the above chart, the binary representation of the multiplicand 12 being 1100 and the binary representation of the multiplier 9 being 1001, the final decimal product 108 reads in binary form as 1101100.

Therefore, to prepare the computer for the multiplication the quantities to be multiplied are registered in the multiplier and multiplicand register 10 and 12 respectively. In this instance the multiplicand "12" (in binary form 1100) is inserted in the register 12 in the reverse order of binary digits as 0011, reading from left to right as illustrated in Fig. 1, the highest order digit thus appearing at the right, as indicated by the legend on the drawing. Similarly, the multiplier "9" (in binary form 1001) is inserted into the register 10 with the highest order digit at the right, also as indicated by a legend on the drawing. It should be noted that during the distribution of the digit pulses to the combining element in the form of the delay line 16 the digit pulses are distributed from the multiplicand register 12 in reverse binary order, from right to left and the digit pulses of the multiplier register 10 in normal order as may be seen from the progression of the suffixed reference characters 72 and 73. It may be appreciated from the above and by reference to the timing diagram of Fig. 9 that, in the case of the present example, partial products may only be derived from the delay line 16 on the first and fourth cycles since during those intervals only is the multiplier a "one."

With reference to the previous chart showing the decimal and binary multiplications, the cyclic action on the recirculating delay line may be seen from the chart below:

| Multiplication Cycle | Multiplicand (12) | Multiplier (9) | Accumulators Open |
|---|---|---|---|
| 1 | 0011 | 1 | 178, 186, *194*, *198* |
| 2 | 1001 | 0 | 186, 194, 198, 180 |
| 3 | 1100 | 0 | 194, 198, 180, 188 |
| 4 | 0110 | 1 | 198, 180, *188*, *196* |

In addition to the multiplication cycles and identifying the relative positions of the multiplicand and multiplier, the chart indicates the accumulators of the product register 20 which are conditioned for entry of the partial product therein. The conditioned accumulators are identified in the above chart with the underlining of the respective accumulator reference numerals which receive a partial product therein in the example being carried out. The column in the chart identified as the multiplicand indicates the relative position of the multiplicand digits upon successive recirculations. It may be readily seen that on the second and third recirculations that there are no accumulators prepared to receive partial products since the multiplier digits during these intervals are zero and correspond with the binary multiplication which was carried out in longhand in the earlier chart herein. Upon the completion of the multiplication cycle, the accumulators, reading from left to right register as follows: 00110110, which when converted to the normal binary arrangement reading from left to right in descending powers reads as 01101100, which agrees with the longhand binary multiplication of the first chart.

Having, therefore, described detailed embodiments of the invention, setting forth its organization and its mode of operation, it will be understood that various omissions and substitutions and changes in the form and details of the circuits illustrated and in their operation may be readily made by those skilled in the art within the scope of the invention. Therefore, those features believed descriptive of the nature of the invention are defined in particularity in the appended claims.

What is claimed is:

1. An electronic multiplier comprising a multiplier receiving device for receiving a multiplier, a multiplicand receiving device for receiving a multiplicand, each of the multiplier and multiplicand receiving devices including a plurality of digit representing elements having two stable conditions and connected in parallel, means for setting each of said elements in a preselected starting condition, means for delivering a plurality of sensing pulses to each of the digit representing elements of the multiplicand and multiplier receiving devices respectively, an acoustic delay element, an input transducer positioned at one end section of the acoustic delay element and arranged to convert an electrical pulse delivered therein to a propagating acoustic pulse, an output transducer positioned on the acoustic delay element at a predetermined distance from the input transducer and arranged to re-convert a propagating acoustic pulse to an electrical pulse, a plurality of sensing means positioned along the acoustic delay element at predetermined distances between said input and said output transducers, the sensing means arranged to receive an acoustic pulse and provide an electrical output pulse upon coincidental arrival of the electrical pulse and an acoustic pulse propagating within the acoustic delay element, controlled means to transfer the digit pulses read out of the multiplicand receiving device by the sensing pulses to the input transducer of the acoustic delay element, further controlled means to successively transfer the digit pulses read out of the multiplier receiving device by the sensing pulses to each of said coincidence transducers a predetermined time interval after the last multiplicand digit pulse has been transferred to said acoustic delay element and during the time intervals the travelling sonic pulses are positioned at separate coincidence transducers, means to recirculate the electrical pulses derived from the output transducer to the input transducer during the intervals between successive transfers of the multiplier digit pulses to the coincidence transducers, and a final product register for receiving and accumulating the output pulses from the outputs of said coincidence transducers, the final product register including a plurality of digit representing elements having two stable conditions and connected in cascade so that a change of each element to one stable condition causes a change in the stable condition of the next higher one.

2. The combination as defined in claim 1 including automatic means for resetting each of the digit representing elements to a preselected starting condition a predetermined interval after the accumulation of the partial products.

3. The combination as defined in claim 1 including means for automatically rounding off the final product at the radix point.

4. An electronic multiplier comprising a multiplier receiving device for receiving a multiplier, a multiplicand receiving device for receiving a multiplicand, each of the multiplier and multiplicand receiving devices including a plurality of digit representing elements having two stable conditions and connected in parallel, means for setting each of said elements in a preselected starting condition, a magnetostrictive sonic delay element serving as a pulse distributor, an input transducer positioned on the pulse distributor delay element for converting an electrical pulse to a sonic pulse, a plurality of output transducers positioned on the pulse distributor delay element at predetermined different distances from the input transducer and operable to re-convert a sonic pulse sensed in the delay element to an electrical pulse, a pulse source connected to the input transducer of the pulse distributor delay element to initiate a pulse therein, means for sequentially delivering a plurality of sensing pulses from said output transducers to each of the digit representing elements of the multiplicand and multiplier receiving devices respectively, a second magnetostrictive sonic delay element serving as a coincidental pulse combining element, an input transducer positioned at one end section of the second delay element and arranged to convert an electrical pulse delivered thereto to a propagating sonic pulse, an output transducer positioned on the magnetostrictive delay element at a predetermined distance from the input trasducer and arranged to re-convert a sonic pulse propagating in said element to an electrical pulse, a plurality of coincidence transducers positioned along the second delay element at predetermined different distances between said input and said output transducers, the coincidence transducers arranged to receive an electrical pulse and provide an electrical output pulse upon coincidental arrival of the electrical pulse and a sonic pulse propagating within the second delay element, controlled means to transfer the digit pulses read out of the multiplicand receiving device by the sensing pulses to the input transducer of the second magnetostrictive sonic delay element, controlled means to successively transfer the digit pulses read out of the multiplier receiving device by the sensing pulses to each of said coincidence transducers a predetermined time interval after the last multiplicand digit pulse has been transferred to said element and during the time intervals the propagating sonic pulses are positioned at separate coincidence transducers, means to recirculate the electrical pulses derived from the output transducer of the second relay line to the input transducer thereof during the intervals between successive transfers of the multiplier digit pulses to the coincidence transducers, a final product register for receiving the output pulses from the outputs of the coincidence transducers, the final product register including a plurality of digit representing elements having two stable conditions and connected in cascade so that a change of each element to one stable condition causes a change in the stable condition of the next higher one, and means for placing each of said elements in a preselected starting condition.

5. The combination as defined in claim 4 wherein the coincidence transducers comprise an input coil coupled to the second magnetostrictive delay element, and an output coil inductively coupled to the input coil and the delay element.

6. The combination as defined in claim 4 wherein the coincidence transducers comprise an input coil coupled to the magnetostrictive delay element, an output coil coupled adjacent the input coil, a magnetic flux source positioned adjacent to the two coils, and controlled impedance means electrically connected to the input coil.

7. An electronic computer for deriving the product of two quantities including means for deriving a separate pulse train representing in binary form each of the two quantities, a separate static storage means for each of said pulse trains, a recirculating magnetostrictive delay line, a first and second transducer means for said magnetostrictive sonic delay line, said first transducer means adapted to produce sonic wave propagation in said delay line, said second transducer means positioned on said delay line transverse to said sonic wave propagation, sensing means for each of said static storage means to read out said voltage pulses representative of said binary quantities, means to transfer said voltage pulses of the first of said quantities to said second transducer means in the same fixed time relationship as delivered to said first transducer means, said transfer means adapted to transfer to said second transducer means said second binary quantity a predetermined later time after the transfer of all the pulses of the first quantity, output means coupled to said second transducer means to derive out a voltage pulse upon coincidence of said sonic wave with said voltage pulse transferred to said second transducer means, a plurality of accumulators each representative of a different binary term, and means to transfer said voltage pulses from said output means to said accumulators.

8. A magnetostrictive delay line as defined in claim 7, including said transducer means transverse to the sonic wave propagation, the latter transducer means consisting of a plurality of coils coupled to said magnetostrictive delay line at predetermined points along said delay line, whereby said sonic wave produces a magnetic field immediate to the area of each of said plurality of coils.

9. An electronic multiplier comprising a multiplier receiving device for receiving a multiplier, a multiplicand receiving device for receiving a multiplicand, each of the multiplier and multiplicand receiving devices including a plurality of digit representing elements having two stable conditions and connected in parallel, means for sequentially reading out the digit pulses of the multiplier and the multiplicand from their respective receiving devices, a magnetostrictive sonic delay element, an input transducer positioned at one end section of the magnetostrictive delay element and arranged to convert an electrical pulse delivered therein to a propagating sonic pulse, an output transducer positioned on the magnetostrictive delay element at a predetermined distance from the input transducer and arranged to re-convert a sonic pulse propagating in said element to an electrical pulse, a plurality of coincidence transducers positioned along the magnetostrictive delay element at predetermined different distances between said input and said output transducers, the coincidence transducers arranged to receive an electrical pulse and provide an electrical output pulse therefrom upon coincidental arrival of the electrical pulse and a sonic pulse propagating within the magnetostrictive delay element, controlled means to transfer the digit pulses read out of the multiplicand receiving device to the input transducer of the magnetostrictive sonic delay element, further controlled means to sequentially transfer the digit pulses read out of the multiplier receiving device to each of said coincidence transducers a predetermined time interval after the last multiplicand digit pulse has been transferred to said element and during the time intervals the travelling sonic pulses are positioned at separate coincidence transducers, means to recirculate the electrical pulses derived from the output transducer to the input transducer during the intervals between successive transfers of the multiplier digit pulses to the coincidence transducers, and means for registering output pulses from the coincidence transducers.

10. An electronic multiplier comprising a multiplier receiving device for receiving a multiplier, a multiplicand receiving device for receiving a multiplicand, each of the multiplier and multiplicand receiving devices including a plurality of digit representing elements having two stable conditions and connected in parallel, a delay element serving as a pulse distributor, input means positioned on the pulse distributor delay element for causing an electrical pulse to propagate therein, a plurality of sensing means positioned on the pulse distributor delay element at predetermined different distances from the input means and operable to provide an output pulse upon the coincidental arrival of the propagating pulse and a pulse delivered thereto, a pulse source connected to the input means of the pulse distributor delay element to initiate a pulse therein, means for sequentially delivering a plurality of sensing pulses from said coincidence means to each of the digit representing elements of the multiplicand and multiplier receiving devices respectively, a magnetostrictive sonic delay element serving as a coincidental pulse combining element, an input transducer positioned at one end section of the delay element and arranged to convert an electrical pulse delivered thereto to a propagating sonic pulse, an output transducer positioned on a magnetostrictive delay element at a predetermined distance from the input transducer and arranged to re-convert a sonic pulse propagating in said element to an electrical pulse, a plurality of coincidence transducers positioned along the sonic delay element at predetermined different distances between said input and said output transducers, the coincidence transducers arranged to receive an electrical pulse and provide an electrical output pulse upon coincidental arrival of the electrical pulse and a sonic pulse propagating within the sonic delay element, controlled means to transfer the digit pulses read out of the multiplicand receiving device by the sensing pulses to the input transducer of the sonic magnetostrictive sonic delay element, further controlled means to successively transfer the digit pulses read out of the multiplier receiving device by the sensing pulses to each of said coincidence transducers a predetermined time interval after the last multiplicand digit pulse has been transferred to said element and during the time intervals the propagating sonic pulses are positioned at separate coincidence transducers, means to recirculate the electrical pulse derived from the output transducer of the sonic delay line to the input transducer thereof during the intervals between successive transfers of the multiplier digit pulses to the coincidence transducers, a final product register for receiving the output pulses from the outputs of the coincidence transducers, the final product register including a plurality of digit representing elements having two stable conditions and connected in cascade so that a change of each element to one stable condition causes a change in the stable condition of the next higher one, bistable means serving to control the digit representing elements to allow only a preselected group of said elements to accumulate the output pulses therein, and means for placing each of said elements in a preselected starting condition.

11. An electronic computer for deriving the product of two quantities each represented as binary coded voltage pulses comprising, in combination, a delay line including a plurality of sensing stations spaced at different points along said delay line, means for propagating through the delay line the voltage pulses representative of one of the quantities in a preselected time sequence equivalent to the time differential spacing of the sensing stations, means for bringing the pulse representation of each digit of the other quantity to be multiplied to each of the sensing stations of the delay line, means for timing the arrival of the latter pulse representations to coincide with the arrival of the propagating pulses at the sensing stations, means for changing the order of the pulse representation of the propagating voltage pulses, and means for accumulating the outputs from the sensing stations.

12. An electronic computer for deriving the product of two quantities comprising in combination, means for generating voltage pulses representative of the digits of each quantity to be multiplied, a delay element, means positioned at pre-selected points on the delay element to sense propagating waves in said delay element and provide output pulses therefrom, means for transferring the pulses representative of one of the quantities to be multiplied into the delay element to propagate same therein, the latter pulses transferred in a pre-selected time relationship, means for bringing the pulse representation of each digit of the other quantity to be multiplied to the sensing means on the delay element, means for timing the arrival of the individual digit pulses to coincide with the arrival of the propagating pulses at the sensing means, means to re-arrange the order of the successive propagating pulses, and means to accumulate the output pulses from the sensing means thereby registering the final product.

13. An electronic multiplier for deriving the product of two quantities each represented as binary coded volttage pulses comprising, in combination, a delay line, an input circuit positioned at one end section of the delay line to allow voltage pulses delivered thereto to propagate along said delay line, an output circuit to receive pulses propagating in the delay line positioned at the opposite end section of said delay line, a plurality of coincidence sensing circuits positioned intermediate the input and output circuits, the coincidence sensing circuits further arranged spaced apart from one another to provide an output pulse therefrom upon the coincidental occurrence of predetermined stimuli, means for introducing the pulses representative of one of the quantities to be multiplied to the input circuit, means for simultaneous introduction of each of the digit pulses representative of the other quantity to be multiplied to the coincidence sensing circuits, means for timing the arrival of the latter pulses at the coincidence circuits to sense the presence of the propagating pulses in the delay line, means for rearranging the order of the propagating pulses in the delay line upon the successive leading pulse arriving at the output circuit of the delay line, and means to accumulate in a predetermined order the output pulses provided by the coincidence sensing circuits.

14. In an electronic computer for deriving the product of two quantities including means for deriving a voltage pulse train representative of the multiplicand, means for deriving voltage pulses representative of the multiplier in a predetermined time relation and order, an acoustic delay element, means for applying the multiplicand pulse train to one end section of the acoustic delay element in a preselected time relation between the individual digit pulses of said pulse train, means positioned at said end section to convert the voltage pulse train to an acoustic pulse train, sensing circuits positioned along the acoustic delay element at intervals corresponding to the time intervals between the successive pulses of the multiplicand pulse train, the sensing circuits adapted to intercept the acoustic pulses and provide electrical output pulses representative of the partial products therefrom, means for simultaneously applying each of the digit pulses of the multiplier to the sensing circuits at time intervals substantially equivalent to the time intervals between successive pulses of the multiplicand pulse train to coincidentally combine with the acoustic stimuli and provide the output pulses, from the sensing circuits, and means for rearranging the order of the pulses of the multiplicand pulse train in the delay element during the intervals between successive applications of the multiplier digit pulse to the sensing circuits, and means for accumulating the pulses representative of the partial products.

15. In an electronic multiplying apparatus for multiplying a preselected multiplicand having a plurality of orders by a preselected multiplier having a plurality of orders and entering the partial products thereof into a result register in response to pulses from a combining source in combination, means to derive a pulse train representative of the multiplicand, a delay line, a multiplicand pulse entry circuit positioned at one end section of the delay line to allow said pulse train to propagate therein, a plurality of coincidental combining circuits spaced from the multiplicand pulse entry circuit and from one another, a multiplicand pulse receiving circuit spaced from the last coincidental combining circuit in the direction of the other end section of the line and connected to said pulse entry circuit to recirculate pulses in the line, means to derive a pulse train representative of the multiplier, and means for simultaneously applying each of the pulses of the multiplier train to the coincidental combining circuits to provide output pulses therefrom representative of partial products upon respective coincidence of the application of multiplier pulses thereto and the occurrence of multiplicand pulses in the line at the locations thereof.

16. Apparatus of the type described in claim 15 including means responsive to the partial product pulses to register the final product.

17. In an electronic computer for deriving the product of two quantities expressed as plural order binary numerals the combination of a static register for each of said quantities, means for deriving a train of electrical pulses from each of said registers having a like basic pulse spacing and respectively characteristic as to the occurrences of the pulses therein of the quantities stored by said registers, an acoustic delay line having means for recirculating sonic pulses propagated therealong, a plurality of transducers uniformly spaced along said line in accordance with the rate of propagation of a sonic pulse in said line and the spacing of the pulses in said trains, said transducers each producing an output pulse responsive to the simultaneous application of an electrical pulse thereto and the occurrence of a sonic pulse in said line at the location of the transducer, means for respectively applying the pulses of said one register-derived train of pulses simultaneously to said several transducers, means for producing a train of sonic pulses in said line and propagated therealong responsive to the application thereto of said other register-derived train of pulses, and an accumulator register connected to all of said transducers for receiving the output pulses generated thereby.

18. In digital computing apparatus the combination of an acoustic delay line, a plurality of coincidence transducers uniformly spaced along said line, interconnected output and input transducers respectively adjacent the ends of the line and spaced from the nearest ones of said coincidence transducers at a distance one half said first spacing for recirculating a train of sonic pulses propagated in said line, means for applying a train of electrical pulses representative of one plural order binary numeral to said line for propagation therein as a corresponding train of sonic pulses, and means for applying the individual pulses of a train of electrical pulses representative of another plural order binary numeral simultaneously to all said coincidence transducers, said coincidence transducers delivering output pulses responsive to the occurrence of a sonic pulse in said line at the location of a transducer and the simultaneous application of an electrical pulse thereto.

19. In an electronic computer for deriving the product of two quantities each represented as binary coded pulses of a variable physical quantity, in combination, a continuous delay line having a constant velocity of propagation for pulses comprised by said representation of the one quantity, means defining a plurality of sensing stations spaced at uniform intervals along said line including transducer means at each station for delivering an output responsive to a coincidence at the station of pulses respectively comprised by said representations of the two quantities, means for propagating through said delay line pulses comprised by said representation of said one quantity in a time sequence representative of such quantity and wherein the time spacing of pulses representative of digits of consecutive binary orders is equal to the pulse propagation time between consecutive ones of said sensing stations, means for bringing a pulse representation of each digit of said representation of the other of the two quantities to be multiplied to each of the sensing stations of the delay line, means for timing the arrival of the latter pulse representations to coincide with the arrival of the propagating pulses at sensing stations, and means for accumulating the outputs of said transducer means thus produced to derive the total product of the two quantities.

20. In an electronic computer for deriving the product of two quantities the combination of means for producing a train of pulses of a variable physical quantity representative of each of said quantities expressed as a binary numeral, said two trains having the same basic pulse spacing in time for digits of consecutive binary orders, a continuous delay element propagating at a constant velocity pulses applied thereto, a linear array of transducers respectively associated with said element and defining an axis thereof, said transducers having a uniform spacing along said axis such that the pulse propagation time between adjacent transducers equals the basic pulse spacing of said trains, each transducer producing an output upon coincidence of the arrival thereat of a pulse propagating in said element and a pulse applied to the transducer from means external to said element, means for initiating the propagation of the pulses of one of said trains in the medium at a common location on said axis and in the time relationship existing in the train, means for applying in turn and in the time relationship existing in said other train each pulse of the other of said trains simultaneously to all said transducers, and means for accumulating the thus induced outputs of said transducers to derive the total product of the two quantities.

21. In computing apparatus for deriving a function of two numerals each expressed in binary notation the combination of a medium capable of propagating pulses of a given character, means for propagating in constant relationship in said medium a sequence of pulses of such character representative of one of said two numerals, an array of pulse coincidence detectors positioned to receive in succession and at uniform increments of time each of said propagating pulses as it progresses in said medium, each detector being adapted to deliver an output responsive to coincidence of such a propagating pulse with a further conditioning pulse supplied to the detector, and means for selectively and in sequence supplying conditioning pulses simultaneously to all said detectors at times selected to coincide with the arrival of propagating pulses thereat, thereby to produce outputs from said coincidence detectors representative of components of said function.

22. The combination defined in claim 21 in which means are provided for supplying a plurality of said conditioning pulses in a time sequence representative of the other of said numerals, and for accumulating the component outputs thus produced to derive a binary representation of said function.

23. A magnetostrictive sonic delay line having at least a pair of transducers coupled thereto for performing a computing function, the first transducer serving to cause a sonic wave representative of a first quantity to travel through the delay line upon the application of an electrical pulse to the transducer, the second transducer coupled to the delay line at a location spaced from the first transducer, the second transducer comprising at least a pair of coils coupled to one another and to substantially the same area of the delay line, one of said second transducer coils generating an output electrical pulse solely in response to coincidence of a sonic pulse propagating in said line and an electrical pulse representative of a second quantity applied to the other coil of said second transducer, means for recirculating a sonic pulse propagating in the line, means for applying a further electrical pulse representative of said second quantity to said other coil of said second transducer so as to generate a second output electrical pulse solely in response to coincidence of said sonic pulse and said further electrical pulse, and means for reducing reflections of said sonic pulse at the ends of the line.

24. Coincidence transducer means for association with a delay element capable of propagating a pulse along a given axis thereof, comprising an output electromagnetic transducer adapted to be coupled to said element at a given point along said axis, said output transducer comprising a pair of coils inductively coupled to one another, means providing a series of binary inputs representative of a quantity, switching means receiving said binary inputs providing two values of impedance loading for one of said coils in response to the respective binary inputs, one of said values substantially preventing a voltage being generated in the other of said coils in response to change of current in said one coil resulting from a propagated pulse in said delay element appearing at said transducer, and means including said means providing a series of binary input for selecting one or the other of said impedance values.

25. A coincidence transducer for a magnetostrictive sonic delay element having an input coil wrapped around a small area of the delay element, an output coil wrapped around the delay element in inductive relation to the input coil, a magnetic flux source positioned adjacent said input and output coils, and means for selectively producing two values of impedance loading of the input coil, said impedance loading means comprising a relatively high impedance and switching means for selectively short-circuiting said high impedance.

26. In computing apparatus the combination of a magnetostrictive delay line adapted to propagate sonic pulses therealong, a transducer associated therewith, an external magnetic flux source for providing magnetic flux at said transducer, the transducer while excited by said magnetic flux normally generating an output pulse responsive to the occurrence of a propagating sonic pulse in the line at the location of the transducer, said transducer comprising a pair of inductively coupled windings linked with said line, means for deriving output pulses from one of said windings, means providing a series of binary inputs representative of a quantity, switching means receiving said binary inputs and providing impedance means terminating the other of said windings, and means for selectively varying the magnitude of the impedance of said last means between two values one of which substantially inhibits the generating of an output signal by said transducer.

27. In computing apparatus, the combination of a continuous material medium for propagating pulses in serial order, one or more coincidence detectors disposed at spaced locations along said medium and operative to detect the passage of pulses therethrough, means connectible to a first source of pulses for serially propagating in said medium a first pattern of pulses representative of a first quantity so that at a given instant of time the pattern appears in spaced relationship within the medium, each pulse of said first pattern appearing at said one or more coincidence detectors in a predetermined time relationship, means connectible to a second source of pulses for applying a second pattern of pulses representative of a second quantity to said one or more coincidence detectors at said given instant of time to effect a time coincidence with the appearance of said first pattern of pulses at the detectors, and output means associated with each of said one or more coincidence detectors for producing an output in response to the coincident appearance at the detector of a pulse from said first and second patterns of pulses.

28. Apparatus for electronically deriving the product of two quantities which comprises a signal transmission medium, means deriving separate signals in binary form representative of each of the digits of each of the quantities to be multiplied in a predetermined time sequence, means transferring all of the binary digit signals representative of the first quantity to said transmission medium, means directing one of the binary digit signals representative of the second quantity to said transmission medium a predetermined time interval after the transfer of the digit signals of the first quantity, transducing means spaced along said transmission medium in accordance with the spaced timing relation of said first quantity, means simultaneously conditioning each of said transducing means in accordance with said one digit signal of said second quantity, means re-arranging the sequence of signals of said first quantity within said transmission medium so as to present a different signal pattern within said transmission medium prior to each successive transfer of the remaining digit signals of the second quantity, means simultaneously conditioning each of said transducing means in accordance with each of said remaining signals of the second quantity in timed relation with the re-arranged order of signals of the first quantity, means deriving in response to the combined signals further signals representative of the partial products of the quantities, and means accumulating the partial products.

29. Apparatus for electronically deriving the product of two quantities represented in binary form which comprises a signal transmission medium, means transferring all of the binary digit signals representative of the first quantity to said transmission medium, means transferring one of the binary digit signals representative of the second quantity to said transmission medium a predetermined time interval after the transfer of the digit signals of the first quantity, spaced apart gating elements along said transmission medium arranged in accordance with the time spacing of said first quantity, means coincidentally combining said one digit signal simultaneously at each of said gating elements with the digit signals representative of the first quantity, means re-arranging the sequence of signals of said first quantity within said transmission medium so as to present a different signal pattern within said transmission medium prior to each successive transfer of the remaining digit signals of the second quantity, means simultaneously conditioning each of said gating elements in accordance with each of said remaining signals of the second quantity in timed relation with the re-arranged order of signals of the first quantity, and means additively registering the resulting pulses from the coincident combination.

References Cited in the file of this patent

UNITED STATES PATENTS

| | | |
|---|---|---|
| 2,334,593 | Wyckoff | Nov. 16, 1943 |
| 2,495,740 | Labin et al. | Jan. 31, 1950 |
| 2,612,603 | Nicholson | Sept. 30, 1952 |
| 2,635,229 | Gloess et al. | Apr. 14, 1953 |
| 2,640,925 | Hirsch | June 2, 1953 |
| 2,686,632 | Wilkinson | Aug. 17, 1954 |
| 2,729,811 | Gloess | Jan. 3, 1956 |
| 2,736,881 | Booth | Feb. 28, 1956 |
| 2,753,527 | Adler | July 3, 1956 |
| 2,771,244 | Raymond | Nov. 26, 1956 |
| 2,790,160 | Millership | Apr. 23, 1957 |

OTHER REFERENCES

Edvac—a functional description of, Moore School of Engineering, Nov. 1, 1949. Volume 1, pp. 4–18 to 4–23 (description) and volume II, sheet 104 3 L D–2 (diagram).